(12) United States Patent
Barroso et al.

(10) Patent No.: US 12,006,443 B2
(45) Date of Patent: Jun. 11, 2024

(54) CORE OR CRAYON FOR WRITING AND/OR COLORING

(71) Applicant: Faber-Castell AG, Stein (DE)

(72) Inventors: Vladimir Barroso, Sao Carlos (BR); Eder D. J. Merola, Sao Carlos (BR); Gerhard Lugert, Nuremberg (DE)

(73) Assignee: Faber-Castell AG, Stein (DE)

( * ) Notice: Subject to any disclaimer, the term of this patent is extended or adjusted under 35 U.S.C. 154(b) by 794 days.

(21) Appl. No.: 17/086,620

(22) Filed: Nov. 2, 2020

(65) Prior Publication Data

US 2021/0130638 A1    May 6, 2021

(30) Foreign Application Priority Data

Oct. 31, 2019   (EP) .................... 19206462

(51) Int. Cl.
    *C09D 13/00*    (2006.01)
    *B43K 19/18*    (2006.01)
    *C09D 7/61*    (2018.01)
    *C09D 7/63*    (2018.01)
    *C09D 191/06*    (2006.01)

(52) U.S. Cl.
    CPC .............. *C09D 13/00* (2013.01); *B43K 19/18* (2013.01); *C09D 7/61* (2018.01); *C09D 7/63* (2018.01); *C09D 191/06* (2013.01)

(58) Field of Classification Search
    CPC ........ B43K 19/003; B43K 19/18; C09D 7/61; C09D 7/63; C09D 13/00; C09D 191/06
    See application file for complete search history.

(56) References Cited

U.S. PATENT DOCUMENTS

2022/0305840 A1*   9/2022   Jakob .................... B43K 19/02

FOREIGN PATENT DOCUMENTS

| DE | 239213 A1 | 9/1986 | |
|---|---|---|---|
| EP | 2520442 A1 | 11/2012 | |
| EP | 2520442 A1 * | 11/2012 | ............. B43K 19/02 |

OTHER PUBLICATIONS

English-language machine translation of EP2520442A1 (Year: 2012).*

* cited by examiner

*Primary Examiner* — James C Goloboy
(74) *Attorney, Agent, or Firm* — Laurence A. Greenberg; Werner H. Stemer; Ralph E. Locher

(57) ABSTRACT

A core or crayon for writing and/or coloring has 15 wt % to 30 wt % of a core base material based on fat and on wax, and 40 wt % to 80 wt % of at least one filler, and 0.1 wt % to 30 wt % of at least one colorant. The core base material includes, based on the total mass of the core, 0.5 wt % to 10 wt % of aluminum distearate, 5 wt % to 20 wt % of oxidized polyethylene wax, and 5 wt %-22 wt % of at least one paraffin wax.

16 Claims, No Drawings

CORE OR CRAYON FOR WRITING AND/OR COLORING

CROSS-REFERENCE TO RELATED APPLICATION

This application claims the priority, under 35 U.S.C. § 119, of European application EP 19 206 462, filed Oct. 31, 2019; the prior application is herewith incorporated by reference in its entirety.

BACKGROUND OF THE INVENTION

Field of the Invention

The invention relates to a core or crayon for writing and/or coloring. Cores for use in a pencil are disposed within a pencil casing made of wood or plastic, for instance; crayons are intended for use without such a casing. When used to produce an applied stroke on a substrate such as paper, a core or crayon is subjected to a relatively high mechanical load. One of the reasons for this is that in writing and coloring work, soft cores, which allow relatively large quantities to be transferred to a substrate, as in the case of cosmetic pencils, for instance, are usually not appropriate. Cores for the purpose in question therefore have a firmer consistency and are overall more stable to breaking than cosmetic cores. The requisite strength in the case of plastic cores, for example, is achieved through the use of polymeric binders. Such plastic cores, while having adequate strength, are nevertheless not ideal in terms of their applied stroke characteristics, since relatively high forces are needed in order to apply to the substrate a quantity of core material sufficient to form applied strokes that are fairly opaque. For the thermoplastic softening of the polymeric binder, moreover, the mixing of the starting substances and the extrusion of core strands have to be carried out at relatively high temperatures of up to 180° C., which firstly implies a correspondingly high energy expenditure and secondly prevents the use of temperature-sensitive color pigments.

Known from European patent application EP 2 520 442 A1 are cores with a core base material based on fat and on wax, where fatty acids and/or fatty acid derivatives are used. A core of this kind can be processed at temperatures below 160° C. and, following its extrusion, is already sufficiently mechanically stable and break-resistant to withstand the loads which occur in the course of normal use. The force applied and the fraction of color pigments for generating a strongly colored, opaque stroke are already reduced relative to polymer-bound cores, a large part of the responsibility for this lying with the fatty substance contained in the core— that is, fatty acid and/or fatty acid derivative. In spite of this, a further reduction in the susceptibility to breakage is desirable.

BRIEF SUMMARY OF THE INVENTION

It is an object of the invention, therefore, to specify an improved core or crayon for writing and/or coloring, more particularly a core or crayon which has an increased flexibility and also a further-reduced susceptibility to breakage.

This object is achieved by means of a core or crayon for writing and/or coloring, which contains 15 wt % to 30 wt % of a core base material based on fat and on wax, and 40 wt % to 80 wt % of at least one filler, and 0.1 wt % to 30 wt % of at least one colorant, wherein the core base material comprises—based on the total mass of the core—0.5 wt % to 10 wt % of aluminum distearate, 5 wt % to 20 wt % of oxidized polyethylene wax, and 5 wt % to 22 wt % of at least one paraffin wax.

The text below refers primarily to cores. The statements, however, are equally valid in relation to crayons.

The starting substances of such a core or crayon, namely the core base material constituents in powder or flake form, at least one admixed filler, and one or more colorants, can be intimately mixed at a temperature of only around 120° C., and extruded at a temperature of around 130° C. The core base material becomes softer in this process, its consistency being such that in spite of a high fraction of filler and colorant, it is possible to extrude core strands having a diameter of for example 3 to 6 mm, or even more in the case of crayons, and to handle these strands without a risk of mechanical impairment, during onward transport to a gluing station, for instance.

In comparison to polymer-bound cores, the cores of the invention can be extruded at high speeds of up to 60 m/min, owing to the sufficiently firm consistency of the core material heated to an extrusion temperature of 130° C., for example. From the extruded core strands it is possible to separate off cores which neither are hard nor have a rubbery consistency and with which strongly colored and opaque applied strokes can be produced on a substrate even with low fractions of colorants.

It has surprisingly emerged that an increase in the flexibility of the cores or crayons is achieved through the use of paraffin waxes rather than of fatty acids and/or fatty acid derivatives. The cores exhibit a much lower breakage rate, with a consequent reduction in particular in the reject rate as the cores are processed into sharpenable, wood-encased pencils. Additionally, as a result of the improved mechanical properties, there is also a significant minimization of the breaking of the cores in wood-encased pencils during sharpening with mechanical hand sharpeners.

More particularly it has proven advantageous to use a microparaffin wax. One such microparaffin wax, for example is available under the trade names Solven Wax 1703) or Polarwachs A7512).

The applied stroke characteristics of the core can be controlled further through the melting point of the paraffin wax used, with a lower melting point resulting in softer and a high melting point in harder strokes deposited. Very good results in terms of the hardness of the deposited stroke have been able to be achieved with a paraffin wax, more particularly a microparaffin wax, having a melting point of preferably 60° C. to 110° C., more preferably having a melting point of 80° C. to 85° C.

A further advantage is that in spite of high fractions of particulate substances such as fillers and colorants, in total only 15 wt % to 30 wt %, preferably 15 wt % to 26 wt %, of core base material is required. Given that the substances of the core base material are comparatively expensive, a resulting cost saving can be made.

The oxidized polyethylene wax used preferably has a melting point of 110° C. to 135° C., more particularly of 115° C. to 130° C. Above these temperatures, the oxidized polyethylene wax has an almost waterlike viscosity. Below these temperatures, however, an outstandingly extrudable material is formed by mixing with the other constituents of the core base material. The oxidized polyethylene waxes preferably used, differing in terms of the melting point, are available for example under the trade names Licowax PED 1212) or Licowax PED 1912).

Regarding aluminum distearate, which makes an important contribution to the profile of properties described for the core and which acts, moreover, as a thickener and hence ensures effective extrusion, amounts of 0.5 wt % to 5 wt % are preferably sufficient, more preferably amounts of 0.5 wt % to 3 wt %.

The fraction of oxidized polyethylene wax can be lowered in particular to 7 wt % to 15 wt %, in order to continue to achieve the best outcomes in terms of the core properties described.

For the paraffin wax, a fraction of 5 to 15 wt % has proven particularly suitable, in order first to reduce the costs and secondly to achieve low susceptibility to core breakage.

The major fraction of the core material is formed by at least one polar filler, preferably a filler from the group consisting of kaolin, mica, pumice flour, and talc, with kaolin being particularly preferred. Because of its polarity, in other words because of the existence of separate focal charge points in its chemical construction, such as its crystal structure, a filler of this kind is bound particularly well by a base material containing substances having polar molecular groups. In this sense, therefore, it is advantageous to use not apolar but rather polar—that is, oxidized—polyethylene wax.

Colorants used are preferably organic and/or inorganic color pigments. On account of their chromophoric groups, these pigments likewise have a polar character and are therefore well bound by the core material proposed.

So that filler particles and color pigment particles do not adversely impact the stroke deposition characteristics or the consistency of the core, leading to a fragile, crumbly consistency, for instance, preference is given to using fillers and color pigments having a mean particle size D90<40 μm.

Other features which are considered as characteristic for the invention are set forth in the appended claims.

Although the invention is described herein as embodied in a core or crayon for writing and/or coloring, it is nevertheless not intended to be limited to the details described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

DETAILED DESCRIPTION OF THE INVENTION

Set out below are four example formulas for colored cores. The starting substances (totaling, e.g., 100 kg) are mixed in a mixer at 120° C. The extrusion of the core material into core strands having a diameter of around 3 to 6 mm takes place, for example, with a twin-screw extruder at a temperature of 130° C. The extrusion of 100 kg of core material takes around 1 h. Downstream of the extruder is a cooling section several meters long. The extruded core strands are separated into individual cores, which can be processed further immediately.

Example A: Green Color Pencil Core with a Diameter of 3.3 mm

| | |
|---|---|
| Aluminum distearate (CAS No. 97404-28-9, m.p. = 140° C.)[1] | 2.10 wt % |
| Oxidized polyethylene wax (Licowax PED 121, CAS No. 68441-17-8, m.p. around 115° C.)[2] | 13.00 wt % |
| Solven Wax 170 (CAS No. 63231-60-7, m.p. around 82° C.)[3] | 7.40 wt % |
| Kaolin BSK-H[4] | 71.50 wt % |
| Pigment Green 7[5] | 2.20 wt % |
| Titanium dioxide Kronos 2300[6] | 3.80 wt % |

Example B: Blue Color Pencil Core with a Diameter of 3.3 mm

| | |
|---|---|
| Aluminum distearate (CAS No. 97404-28-9, m.p. = 140° C.)[1] | 1.70 wt % |
| Oxidized polyethylene wax (Licowax PED 121, CAS No. 68441-17-8, m.p. around 115° C.)[2] | 9.30 wt % |
| Solven Wax 170 (CAS No. 63231-60-7, m.p. around 82° C.)[3] | 5.00 wt % |
| Compacted Talc GM10[7] | 80.00 wt % |
| Titanium dioxide Kronos 2300[6] | 1.00 wt % |
| Cosmos Blue ASF[8] | 2.75 wt % |
| Permanent carmine FBB[9] | 0.25 wt % |

Example C: Violet Color Pencil Core with a Diameter of 5.5 mm

| | |
|---|---|
| Aluminum distearate (CAS No. 97404-28-9, m.p. = 140° C.)[1] | 1.00 wt % |
| Oxidized polyethylene wax (Licowax PED 191, CAS No. 68441-17-8, m.p. around 120-130° C.)[2] | 9.00 wt % |
| Solven Wax 170 (CAS No. 63231-60-7, m.p. around 82° C.)[3] | 10.00 wt % |
| Kaolin Speswhite (CAS No. 1332-58-7)[10] | 77.64 wt % |
| Pigment Violet 23[11] | 2.36 wt % |

Example D: Red Color Pencil Core with a Diameter of 3.8 mm

| | |
|---|---|
| Aluminum distearate (CAS No. 97404-28-9, m.p. = 140° C.)[1] | 1.00 wt % |
| Oxidized polyethylene wax (Licowax PED 191, CAS No. 68441-17-8, m.p. around 120-130° C.)[2] | 13.00 wt % |
| Polarwachs A75 (paraffin wax, dropping point: ISO 2176 78-82° C.)[12] | 12.00 wt % |
| Kaolin Speswhite (CAS No. 1332-58-7)[10] | 69.00 wt % |
| Pigment Red 2[13] | 5 wt % |

The mechanical properties of the cores of the invention were investigated by conducting a drop test. In this test the cores are rolled from a height of 50 cm from a table, and drop onto a floor laid with ceramic tiles. The table below lists the experimental results for two cores of the invention as per examples A and B above and also for two comparative cores C1 (core as per example 5 from European patent application EP 2 520 442 A1) and C2 (core as per example 3 from European patent application EP 2 520 442 A1). In order to obtain a meaningful result, the drop test was carried out with 80 cores each per formula. The core breakages per core were ascertained subsequently.

TABLE 1

| Number of core breakages per core | Comparative core C1 | Comparative core C2 | Example A | Example B |
|---|---|---|---|---|
| 0 | 0 (0%) | 0 (0%) | 14 (17.5%) | 19 (23.75%) |
| 1 | 2 (2.50%) | 3 (3.75%) | 63 (78.75%) | 54 (67.50%) |
| 2 | 42 (52.50%) | 38 (47.50%) | 2 (2.50%) | 5 (6.25%) |
| 3 | 12 (15.00%) | 20 (25.00%) | 1 (1.25%) | 2 (2.50%) |
| 4 | 20 (25.00%) | 12 (15.00%) | 0 | 0 |
| 5 or more | 4 (5.00%) | 7 (8.75%) | 0 | 0 |

In the drop test it emerged that the cores of the invention are much less susceptible to breakage. As a result, the reject rate on processing into wood-encased, sharpenable pencils is reduced, and an increase is achieved in the useful life of the pencils or crayons.

In addition, as a result of the improved mechanical properties, there is also a significant minimization of the breaking of the cores in wood-encased pencils during sharpening using mechanical hand sharpeners. A test to this effect showed a possible reduction in core breakages during sharpening from around 4% in the case of the comparative cores C1 and C2 to less than 2% in the case of cores of the invention as per examples A and B.

Manufacturer/Supplier:
1) Peter Greven, D-53902 Bad Münstereifel
2) Clariant AG, D-65929 Frankfurt am Main
3) Solven Solventes e Quimicos LTDA., St. Professora Abigal Alves Pires, 301—Ch. Nova Boa Vista—Hortolandia/SP ZIP code: 13185-071 Brazil
4) Amberger Kaolinwerke, D-92242 Hirschau
5) Clariant AG, D-65929 Frankfurt am Main
6) Kronos, D-51737 Leverkusen
7) Magnesita S.A., Bela Vista—01311-000 Sao Paolo/SP
8) Toyo INK, 60870 Villers Saint Paul, France
9) Clariant AG, D-65929 Frankfurt am Main
10) Imerys Minerals Ltd. Cornwall, PL24 2SQ, United Kingdom
11) Clariant AG, D-65929 Frankfurt am Main
12) Wachs-u. Ceresin-Fabriken, Th. C. Tromm GmbH, Feuerstr. 7-17, D 50735 Cologne
13) Clariant AG, D-65929 Frankfurt am Main

The invention claimed is:

1. A core or crayon for writing and/or coloring, comprising:
15 wt % to 30 wt % of a core base material based on fat and on wax, the core base material having, based on a total mass of the core, 0.5 wt % to 10 wt % of aluminum distearate, 5 wt % to 20 wt % of oxidized polyethylene wax, and 5 wt %-22 wt % of at least one paraffin wax;
40 wt % to 80 wt % of at least one filler; and
0.1 wt % to 30 wt % of at least one colorant.

2. The core or crayon according to claim 1, wherein said at least one paraffin wax is at least one microparaffin wax.

3. The core or crayon according to claim 1, wherein said at least one paraffin wax has a melting point of 60° C. to 110° C.

4. The core or crayon according to claim 3, wherein said paraffin wax has a melting point of 80° C. to 85° C.

5. The core or crayon according to claim 1, wherein a fraction of said core base material is not more than 26 wt %.

6. The core or crayon according to claim 1, wherein said oxidized polyethylene wax has a melting point of 110° C. to 135° C.

7. The core or crayon according to claim 6, wherein said oxidized polyethylene wax has a melting point of 115° C. to 130° C.

8. The core or crayon according to claim 1, wherein a fraction of said aluminum distearate is 0.5 wt % to 5 wt %.

9. The core or crayon according to claim 8, wherein a fraction of said aluminum distearate is 0.5 wt % to 3 wt %.

10. The core or crayon according to claim 1, wherein a fraction of said oxidized polyethylene wax is 7 wt % to 15 wt %.

11. The core or crayon according to claim 1, wherein a fraction of said paraffin wax is 5 to 15 wt %.

12. The core or crayon according to claim 1, wherein said at least one filler includes kaolin, mica, pumice flour and/or talc.

13. The core or crayon according to claim 1, wherein said at least one colorant includes organic and/or inorganic color pigments.

14. The core or crayon according to claim 13, wherein said at least one filler and said color pigments have a mean particle size D90<40 μm.

15. The core or crayon according to claim 3, wherein said at least one microparaffin wax has a melting point of 60° C. to 110° C.

16. The core or crayon according to claim 4, wherein said at least one microparaffin wax has a melting point of 80° C. to 85° C.

* * * * *